United States Patent
Wada

[19]

[11] Patent Number: 6,064,544
[45] Date of Patent: *May 16, 2000

[54] INFORMATION MEDIUM CONVEYING METHOD AND APPARATUS

[75] Inventor: Satoshi Wada, Yamagata, Japan

[73] Assignee: NEC Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 09/097,673

[22] Filed: Jun. 16, 1998

[51] Int. Cl.$^7$ .............................. G11B 15/68; G11B 17/22
[52] U.S. Cl. ................................ 360/92; 369/36; 369/178
[58] Field of Search .................................. 360/92; 369/36, 369/38, 178, 191–194

[56] References Cited

U.S. PATENT DOCUMENTS

| | | | |
|---|---|---|---|
| 4,608,679 | 8/1986 | Rudy et al. | 369/36 |
| 4,614,474 | 9/1986 | Sudo | 414/281 |
| 4,787,074 | 11/1988 | Deck et al. | 369/36 |
| 5,014,255 | 5/1991 | Wanger et al. | 369/36 |
| 5,101,387 | 3/1992 | Wanger et al. | 369/36 |
| 5,497,057 | 3/1996 | Danielson et al. | 318/371 |
| 5,502,697 | 3/1996 | Taki | 369/34 |
| 5,638,349 | 6/1997 | Rugg et al. | 369/36 |

FOREIGN PATENT DOCUMENTS

| | | |
|---|---|---|
| 53-22709 | 3/1978 | Japan . |
| 61-255557 | 11/1986 | Japan . |
| 62-243253 | 10/1987 | Japan . |
| 63-061482 | 3/1988 | Japan . |
| 1-076450 | 3/1989 | Japan . |
| 1-146157 | 6/1989 | Japan . |
| 1-319164 | 12/1989 | Japan . |
| 2/42671 | 2/1990 | Japan . |

*Primary Examiner*—William Klimowicz
*Attorney, Agent, or Firm*—Whitham, Curtis, Whitham

[57] ABSTRACT

A double-frame type library apparatus is capable of shortening the time required in exchange process of recording media between storage compartments. A grasping member has a first member and a second member which are faced outwardly in opposite directions and, the grasping member is conveyed by a conveying member to a position corresponding to a desired storage compartment of the first and second storage frame. The first and second members of the grasping member are reversed on the conveying member by a direction reversing member.

20 Claims, 6 Drawing Sheets

INFORMATION MEDIUM CONVEYING METHOD AND APPARATUS

BACKGROUND OF THE INVENTION

1. Field of the Invention

The present invention relates to a double-frame type library apparatus having front and rear storage compartment frames, and more particularly to method and apparatus for conveying information media such as magnetic tape between storage compartments.

2. Description of the Relevant Art

As an example of double-frame type library apparatus, a cartridge magnetic tape apparatus has been disclosed in Japanese Patent Application Laid-open No. 6-111439. In this cartridge magnetic tape apparatus, storage compartments each for containing a cartridge accommodating a magnetic tape are disposed separately in the front storage compartment frame and the rear storage compartment frame opposing each other, and a conveying means for conveying a cartridge between storage compartments are provided.

The conveying means is composed of a grasping means formed as a pair of fingers and a conveying mechanism for conveying the grasping means in the X-Y direction and the Z direction orthogonal to the X-Y direction. The conveying mechanism is disposed between the opposing storage compartment frames. The grasping means is composed of a plate member in a nearly T-form having a pair of fingers disposed mutually opposing in the Y direction and extending in the Z direction, and as the fingers approach/depart to/from each other by a driving mechanism, the cartridge is grasped or released.

In such conventional cartridge magnetic tape apparatus, for example, the cartridge taken out of the front storage compartment frame by the grasping means can be directly conveyed and stored into the rear storage compartment frame. However, the number of cartridges that can be conveyed at once is limited to one, and when exchanging cartridges between the front storage compartment frame and rear storage compartment frame, the following complicated process is needed. That is, the grasping means is conveyed into a desired first storage compartment in the front storage compartment frame, the cartridge taken out of the first storage compartment is once put temporarily in another storage compartment, and the other cartridge taken out from a desired second storage compartment in the rear storage compartment frame is put in the first storage compartment. Further, the cartridge temporarily put in the other storage compartment is taken out and put into the second storage compartment.

In such conventional cartridge magnetic tape apparatus, to enhance the speed in the exchange process, two sets of such conveying mechanism having the grasping means in the above constitution are required, and the number of constituent parts in the apparatus is increased.

SUMMARY OF THE INVENTION

It is therefore an object of the invention to provide a double-frame type library apparatus and a conveying method which can rapidly convey two information media and store them into desired storage compartments, respectively, with suppressing the number of constituent parts.

It is another object of the invention to provide a method which is capable of shortening the time required in the exchange process of information media between storage compartments.

To achieve the object, a first aspect of the present invention provides a double-frame type library apparatus comprising first and second storage frame each having a plurality of storage compartments for accommodating information media, respectively, wherein the first and second storage compartment frames are opposite to each other. The double-frame type library apparatus is further comprised of a grasping member having a first member for grasping a first information medium and a second member for grasping a second information medium, wherein the first and second members are faced outwardly in opposite directions, a conveying member for conveying the grasping members to a position corresponding to a desired storage compartment of the first and second storage frame, and a direction reversing member for reversing the first member and the second member on the conveying member.

In the double-frame type library apparatus of the present invention, for example, a pair of first and second members are conveyed integrally by the conveying member, and the first member is located at a position corresponding to a desired first storage compartment in the first storage compartment frame. Next, by the action of the first member, a first information medium in the first storage compartment is taken out, and in this state, then, the second member is located at a position corresponding to a desired second storage compartment in the second storage compartment frame. At this time, by operating the second medium grasping means, a second information medium in the second storage compartment is taken out, and the direction of the first and second members is integrally reversed by the direction reversing member. In this manner, the first information medium can be changed from the first storage compartment to the second storage compartment. Similarly, the second information medium can be changed from the second storage compartment to the first storage compartment.

Thus, the double-frame type library apparatus does not require two sets of conveying mechanism having the grasping member as in the conventional apparatus. Therefore, high speed operation is realized in the exchange process of information media while suppressing increase of constituent parts.

The grasping member may further comprise a driving member for driving one of the first and second members. Further, the first member may comprise a pair of first finger which are each rotatably supported to the conveying member, wherein the first fingers are energized in closing direction and are forced to be opened by the driving member. On the other hand, the second member may comprise a pair of second fingers which are each rotatably supported to the conveying member, wherein the second fingers are energized in closing direction and are forced to be opened by the driving member. Since the grasping member is formed with first fingers and second fingers, the mechanism of the grasping member is simplified.

The driving member may comprise a cam which is rotatably provided between the first and second members, the cam rotating such that the cam presses the first fingers to be opened at a first rotation position, presses the second fingers to be opened at a second rotation position, and presses neither the first fingers nor second fingers at a third rotation position. Since the open/close operation of the first and second fingers can be performed by rotating the cam, the mechanism of the grasping member is further simplified.

DETAILED DESCRIPTION OF THE PREFERRED EMBODIMENT

There will be detailed below the preferred embodiment of the present invention with reference to the accompanying drawings.

Figure 1:
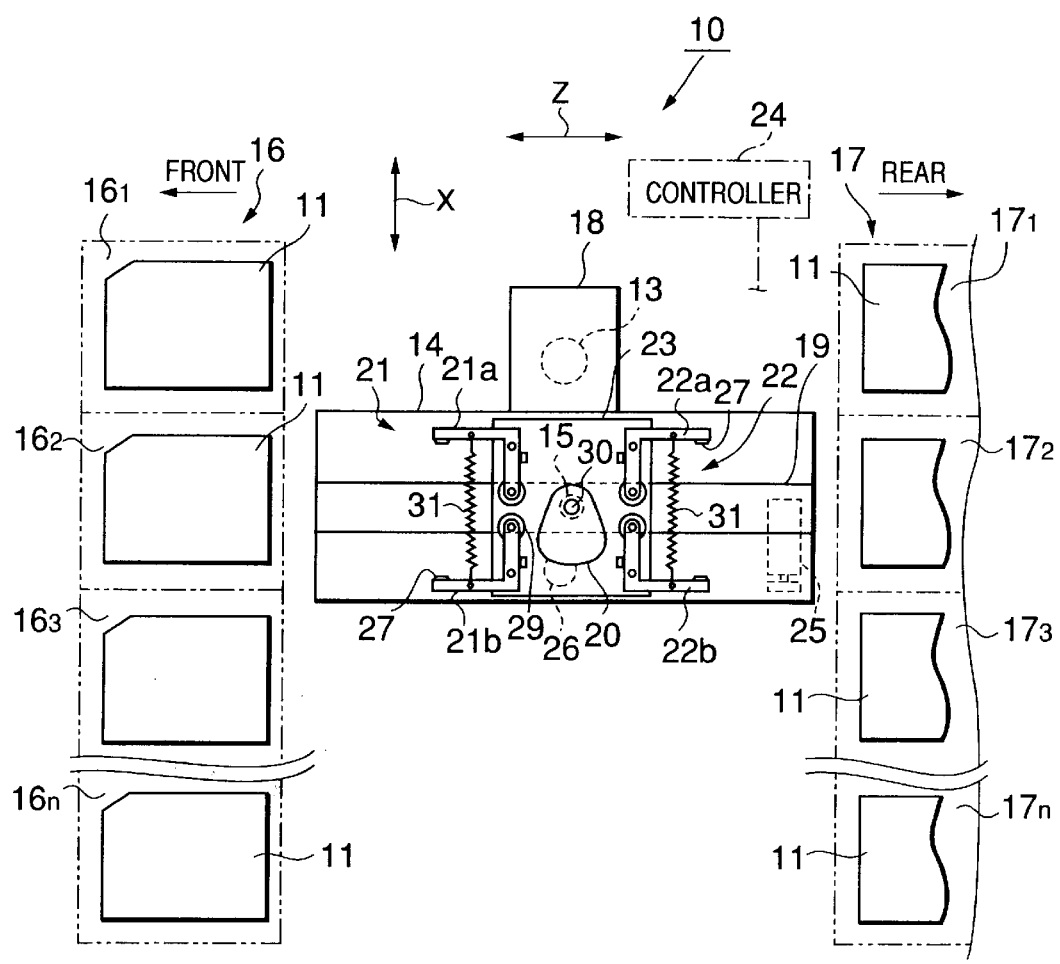
FIG. 1 is a plan view showing an initial state of an entire construction of a double-frame type library apparatus according to an embodiment of the invention.

Referring to FIG. 1, a double-frame type library apparatus 10 is comprised of a front storage compartment frame 16 and a rear storage compartment frame 17 which are disposed as opposed to each other in the direction Z. The front storage compartment frame 16 contains a plurality of storage compartments $16_1$ to $16_n$, and the rear storage compartment frame 17 contains a plurality of storage compartments $17_1$ to $17_n$. Each of the storage compartments $16_1$ to $16_n$ and $17_1$ to $17_n$ can store a cartridge 11 accommodating a magnetic tape as a recording medium. The storage compartments $16_1$ to $16_n$ and $17_1$ to $17_n$ also include similar storage compartments in the depth direction of the sheet of paper in the drawing but are not shown therein.

The double-frame type library apparatus 10 is further comprised of a recording/reproducing section (not shown) and a controller 24. The recording/reproducing section performs at least one of recording and reproducing of information on magnetic tapes. The controller 24 comprehensively controls the operations of the double-frame type library apparatus 10.

Conveying Means

A conveying means is disposed between the front storage compartment frame 16 and the rear storage compartment frame 17 and is designed to integrally convey a pair of recording medium grasping means 21 and 22 supported on a finger base 23 in X-Y-Z directions as described later. The conveying means is composed of a hand base 14 for movably supporting the finger base 23 and an access mechanism for conveying the hand base 14 in the X-Y direction between the front storage compartment frame 16 and the rear storage compartment frame 17. A positioning means (not shown) is included in the access mechanism.

The access mechanism is disposed between the storage compartment frames 16 and 17, and includes a swivel base 18 movable in both the X-direction which is the vertical direction in the drawing, and the Y-direction which is the depth direction on the sheet of paper. The hand base 14 is supported on the swivel base 18 rotatably about its center. The hand base 14 is rotated in the clockwise direction or counterclockwise direction in FIG. 1 about a rotary shaft 15, by a swivel motor 13 mounted on the swivel base 18.

The hand base 14 has a slide guide 19 extending in the Z direction orthogonal to the X-Y direction, and the finger base 23 is supported on the slide guide 19 movably in the same direction. The finger base 23 can move in the X-direction as the rotation of a picker motor 25 disposed at the side of the hand base 14 is transmitted through a belt or the like. The hand base 14, swivel base 18, and swivel motor 13 compose a direction reversing section which integrally reverses the directions of the recording medium grasping means 21, 22 on the conveying means.

Grasping Means

Figure 2:
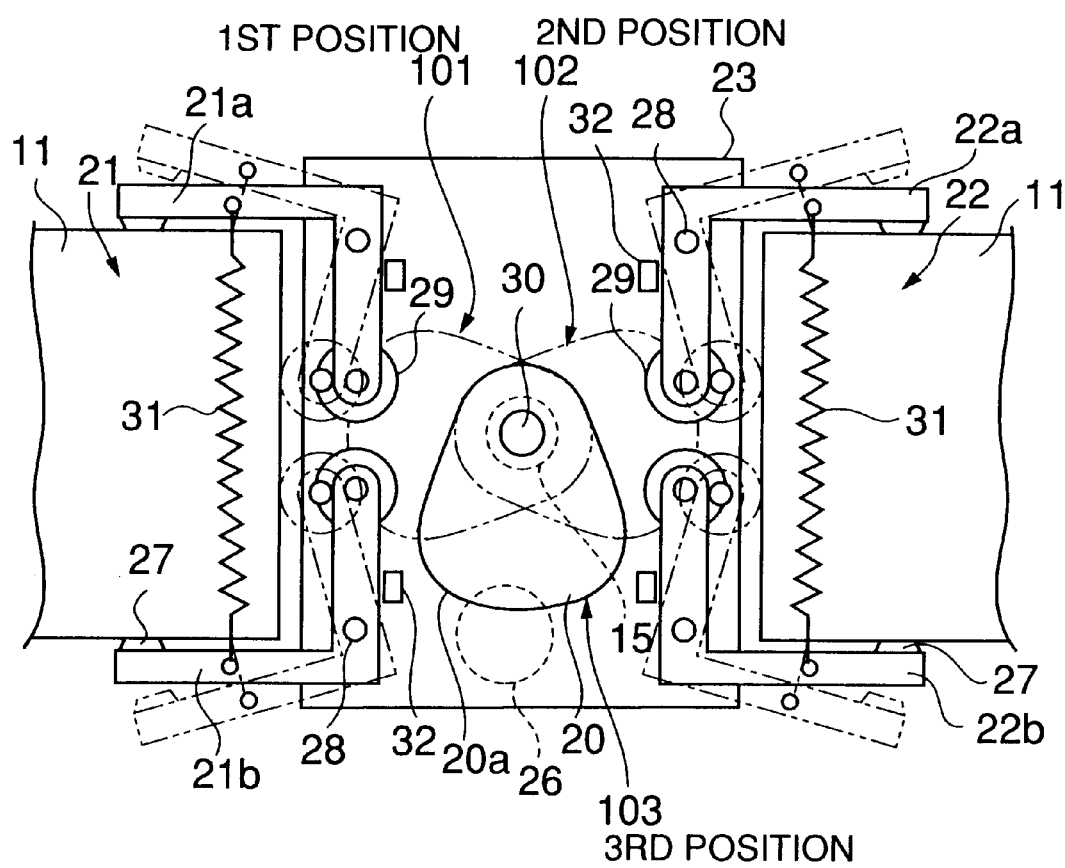
FIG. 2 is a plan view showing the detail of recording medium grasping means.

As shown in FIG. 2, recording medium grasping means 21, 22 are supported by the finger base 23, back to back, so that the grasping surfaces may face mutually in reverse directions. By the recording medium grasping means 21 and 22 individually performing open and close actions, a cartridge 11 is grasped or released. The recording medium grasping means 21 includes a pair of L-shaped fingers 21a and 21b. Similarly, the recording medium grasping means 22 includes a pair of L-shaped fingers 22a and 22b.

The fingers 21a, 21b are disposed at mutually mirror symmetrical positions, and the middle position is rotatably supported on the finger base 23 by a rotary shaft 28. The fingers 21a, 21b are thrust by a spring 31 in such a direction that the ends facing the grasping surfaces may approach each other. A cam roller 29 is disposed at the other ends adjacent to each other. On the individual grasping surfaces of the fingers 21a, 21b, a finger rubber 27 is provided for suppressing slipping when taking out the cartridge by a frictional force. The fingers 22a, 22b are similar to the fingers 21a, 21b in the principal constitution except that the grasping surfaces are in reverse direction to the fingers 21a, 21b.

On the finger base 23, a finger cam 20 is disposed between the recording medium grasping means 21 and 22. The finger cam 20 rotates about a rotary shaft 30, and has a cam surface 20a projecting to an eccentric position to the rotary shaft 30. On the finger base 23, moreover, stoppers 32 are disposed at positions opposing the back side of each other end of the fingers 21a, 21b, and 22a, 22b. The fingers 21a, 21b, and 22a, 22b rotate, in free state, by receiving the thrusting force of the spring 31 until coming in contact with the corresponding stoppers 32. At this time, each cam roller 29 is positioned on the track of rotation of the cam surface 20a of the finger cam 20.

The finger cam 20, receiving the rotation of a finger cam motor 26 disposed on the finger base 23, rotates to a first rotation position 101 indicated by double dot chain line in the drawing, a second rotation position 102 indicated by single dot chain line, and a third rotation position 103 indicated by solid line. The first rotation position 101 is a position for pressing the cam rollers 29 of both fingers 21a, 21b, and releasing the recording medium grasping means 21, and the second rotation position 102 is a position for pressing the cam rollers 29 of both fingers 22a, 22b, and releasing the recording medium grasping means 22. The third rotation position 103 is a position for closing the both recording medium grasping means 21, 22 without pressing any one of the cam rollers 29. Therefore, such a neutral position may be opposed to the third rotation position 103.

Cartridge Exchanging Process

The operation of thus constituted double-frame type library apparatus is described below while referring to FIG. 3 through FIG. 6. As an example, the operation for exchanging a cartridge 11A stored in the storage compartment $16_2$ and a cartridge 11B stored in the storage compartment $17_3$ will be explained.

Figure 3:
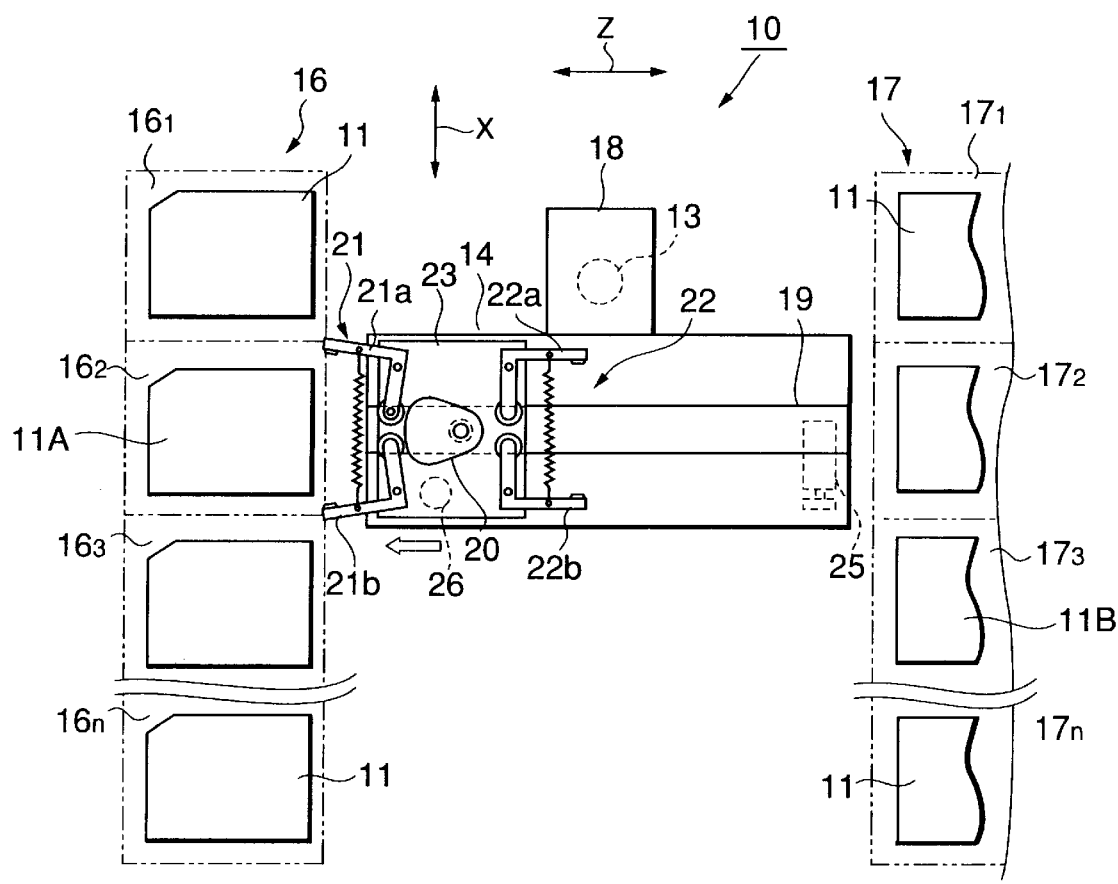
FIG. 3 is a plan view showing gradual steps of a first grasping state of the recording medium grasping means.

After the hand base 14 on the swivel base 18 has been moved to the position of the storage compartment $16_2$ by the access mechanism, in the initial state as shown in FIG. 1, rotation of the finger cam motor 26 causes the finger cam 20 to rotate clockwise. When the finger cam 20 rotates up to the first rotation position 101, the individual finger rollers 29 of the fingers 21a, 21b are pressed by the cam surface 20a, and the recording medium grasping means 21 is released. Successively, the picker motor 25 rotates, and the finger base 23 moves on the hand base 14 toward the storage compartment $16_2$, and comes to the state as shown in FIG. 3.

When the finger base 23 further moves in the same direction, the released recording medium grasping means 21 gets into the storage compartment $16_2$, and the ends of the fingers 21a, 21b are positioned at both sides of the cartridge 11A. In this state, the finger cam motor 26 rotates, and the finger cam 20 rotates to the third rotation position 103 or similar neutral position, so that the recording medium grasping means 21 closes according to the thrusting force of the string 31. As a result, the recording medium grasping means 21 grasps the cartridge 11A through the finger rubber 27.

Figure 4:
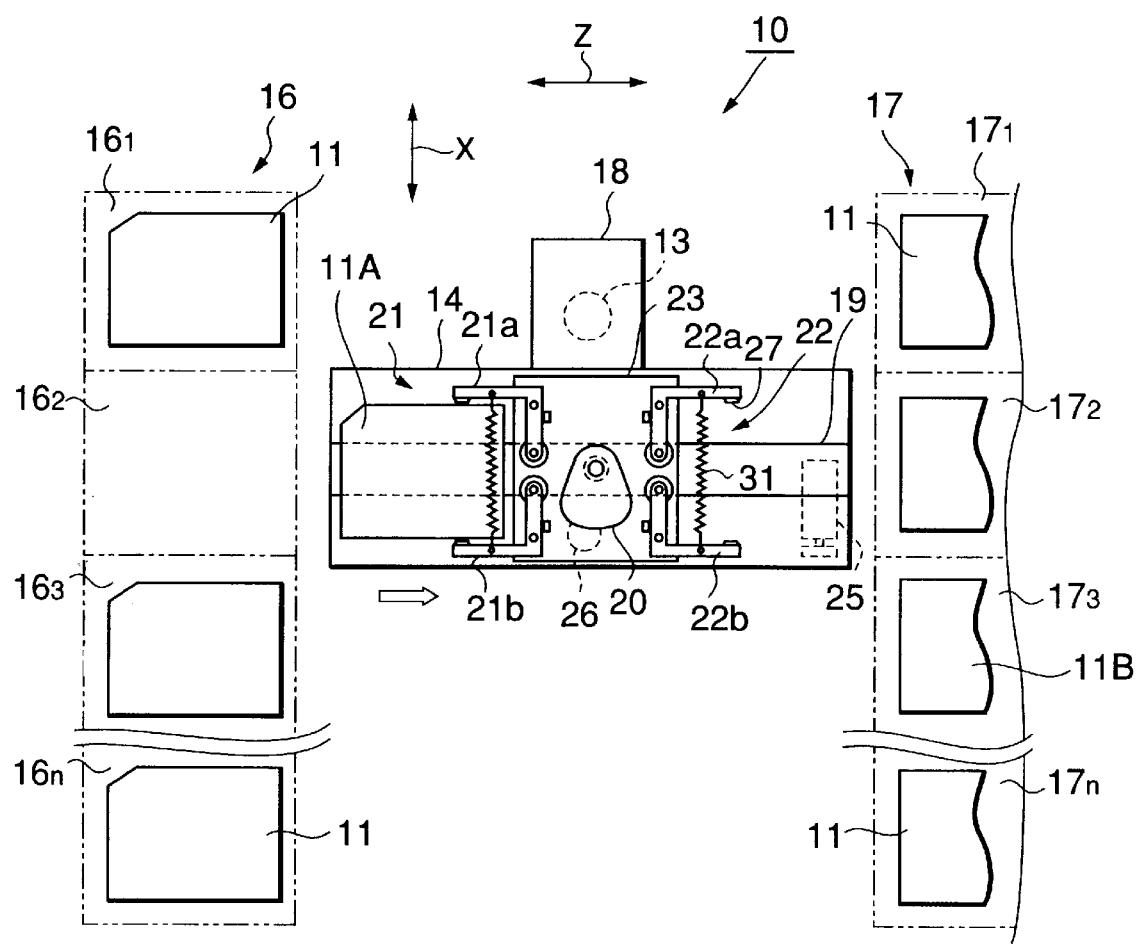
FIG. 4 is a plan view showing gradual steps of a conveying state of the recording medium grasping means.
Figure 5:
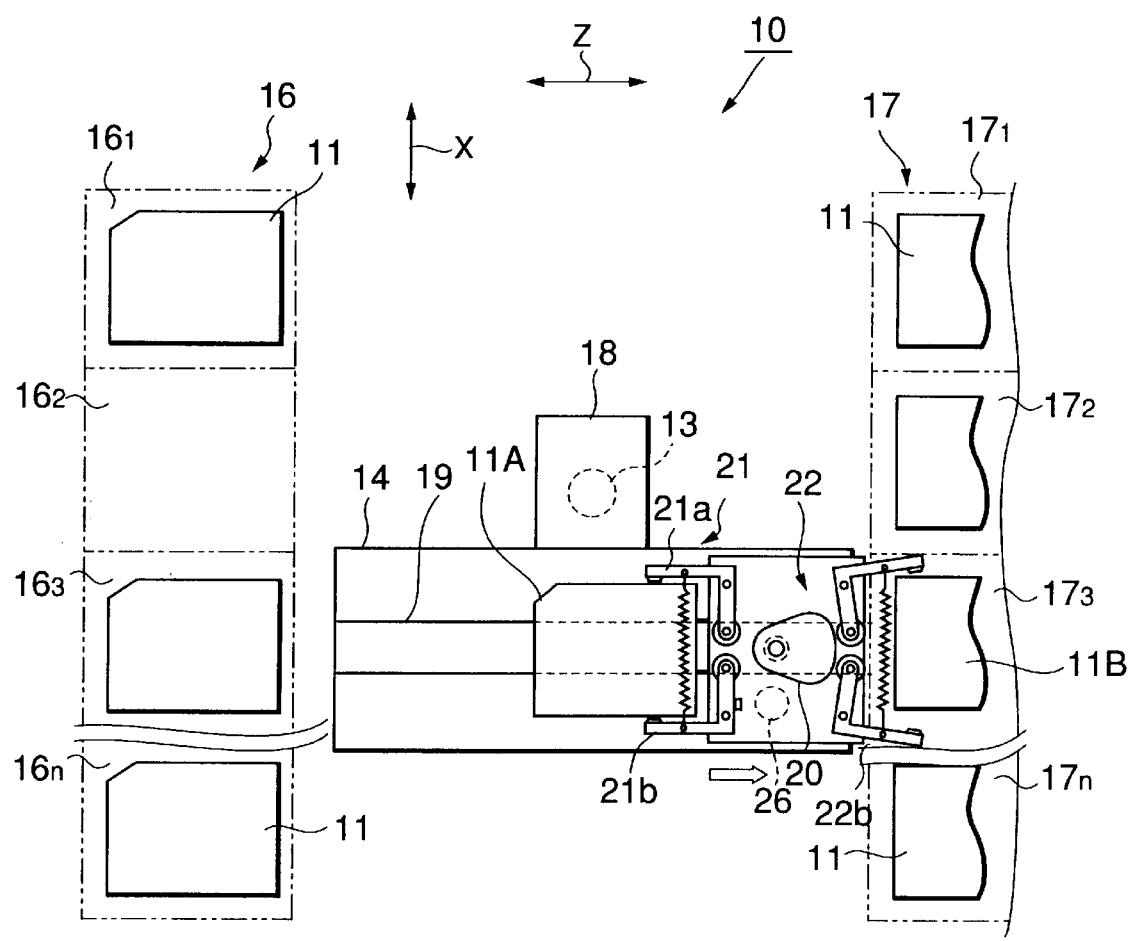
FIG. 5 is a plan view showing gradual steps of a second grasping state of the recording medium grasping means.

Consequently, by the rotation of the picker motor 25, the finger base 23 returns to the initial position in the center of the hand base to come to the state of grasping the cartridge 11A as shown in FIG. 4. Further, the access mechanism is actuated to move the swivel base 18 in the X direction, and the recording medium grasping means 22 is stopped at a position corresponding to the storage compartment $17_3$.

In this state, the finger cam 20 rotates to the second rotation position 102, and the finger rollers 29 of the fingers 22a, 22b are pressed by the cam surface 20a, thereby releasing the recording medium grasping means 22. In succession, the picker motor 25 rotates, and the finger base 23 moves on the hand base 14 toward the storage compartment $17_3$ to come to the state shown in FIG. 5. As the finger base 23 further moves in the same direction, the released recording medium grasping means 22 gets into the storage compartment $17_3$, and the ends of the fingers 22a, 22b are positioned at both sides of the cartridge 11B. In this state, the finger cam 20 rotates to the third rotation position 103, where the recording medium grasping means 22 is rotated in the closing direction by the spring 31, thereby grasping the cartridge 11B through the finger rubber 27.

Consequently, the finger base 23 with the recording medium grasping means 22 grasping the cartridge 11B retreats from the storage compartment $17_3$, and returns to the center of the hand base while grasping the cartridge 11A from the storage compartment $16_2$ by the recording medium grasping means 21.

Figure 6:
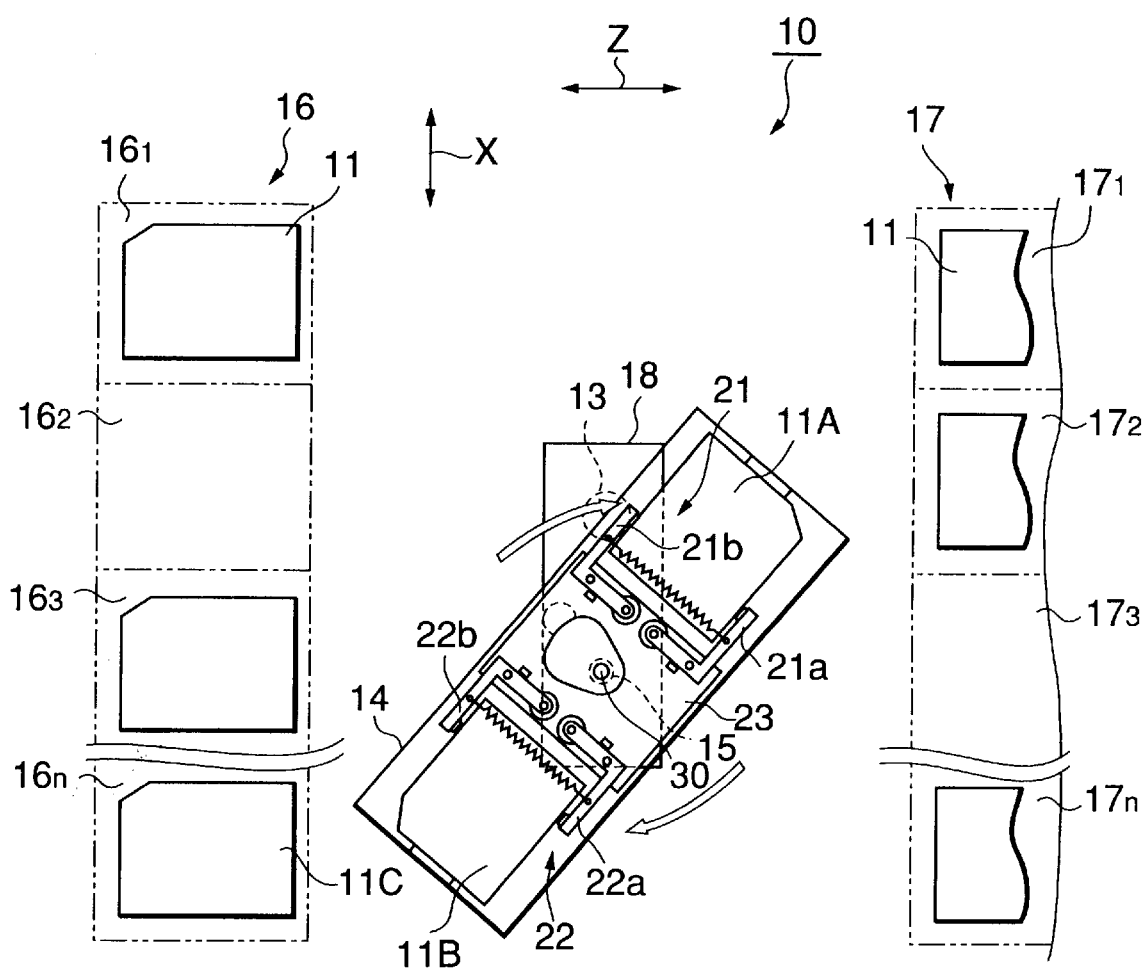
FIG. 6 is a plan view showing gradual steps of a rotating state of the recording medium grasping means.

In this state, the swivel motor 13 rotates, and the hand base 14 rotates in the clockwise direction about the rotary shaft 15. Consequently, the recording medium grasping means 21, 22 are reversed integrally in the direction of the grasping surfaces as shown in FIG. 6, so that the recording medium grasping means 21 grasping the cartridge 11A is directed to the storage compartment $17_3$ and the recording medium grasping means 22 grasping the cartridge 11B is directed to the storage compartment $16_3$.

In this state, the picker motor 25 rotates, and the finger base 23 moves on the hand base 14 toward the storage compartment $17_3$, and the cartridge 11A grasped by the recording medium grasping means 21 is inserted into the storage compartment $17_3$. Then the finger cam 20 rotates to the first rotation position 101 which causes the recording medium grasping means 21 to be released and the grasped cartridge 11A to be set free. As a result, the cartridge 11A which was stored in the storage compartment $16_2$ is now put into the storage compartment $17_3$.

Successively, the picker motor 25 rotates, and the finger base 23 moves back toward the center on the hand base 14.

Thereafter, the hand base 14 on the swivel base 18 is moved to the position of the storage compartment $16_2$ by the access mechanism.

When the recording medium grasping means 22 grasping the cartridge 11B is directed to the storage compartment $16_3$, the picker motor 25 rotates, and the finger base 23 moves on the hand base 14 toward the storage compartment $16_2$. Thereby the cartridge 11B grasped by the recording medium grasping means 22 is inserted into the storage compartment $16_2$. Then the finger cam 20 rotates to the second rotation position 102 which causes the recording medium grasping means 22 to be released and the grasped cartridge 11B to be set free. As a result, the cartridge 11B which was stored in the storage compartment $17_3$ is now put into the storage compartment $16_2$.

Thus, according to the double-frame type library apparatus 10 as described above, the direction of the grasping surfaces of the recording medium grasping means 21, 22 conveyed integrally can be reversed integrally. Therefore, two grasped cartridges can be conveyed simultaneously by the recording medium grasping means 21, 22, and moreover the direction of the grasped cartridges can be freely changed, so that the exchange process of cartridges is very simple and enhanced in speed.

In the illustrated embodiment, only the exchange process of cartridges between mutually opposing storage compartment frames 16, 17 is explained, but in the double-frame type library apparatus 10, the exchange process between storage compartments in one of the storage compartment frames 16 and 17 may be similarly executed.

For example, in the case of exchanging a cartridge 11A and another cartridge 11C which are stored in the storage compartments $16_2$ and $16_n$, respectively, the recording medium grasping means 21 grasps the cartridge 11A as shown in FIG. 4. Thereafter, the swivel motor 13 rotates, and the hand base 14 rotates in the clockwise direction about the rotary shaft 15. Consequently, the recording medium grasping means 21, 22 are reversed integrally in the direction of the grasping surfaces, so that the recording medium grasping means 21 grasping the cartridge 11A is directed to the storage compartment frame 17 and the recording medium grasping means 22 is directed to the storage compartment frame 16.

Subsequently, the access mechanism is actuated to move the swivel base 18 in the X direction, and the recording medium grasping means 22 is stopped at a position corresponding to the storage compartment $16_n$. And the cartridge 11C storing the storage compartment $16_n$ is grasped by the recording medium grasping means 22 as described above.

Thereafter, the recording medium grasping means 21, 22 are reversed again in the direction of the grasping surfaces, so that the recording medium grasping means 21 grasping the cartridge 11A is directed to the storage compartment $16_n$ and the recording medium grasping means 22 grasping the cartridge 11C is directed to the storage compartment frame 17. In this state, the picker motor 25 rotates, and the finger base 23 moves on the hand base 14 toward the storage compartment $16_n$, and the cartridge 11A is put into the storage compartment $16_n$ as described above.

Further, the recording medium grasping means 21, 22 are reversed in the direction of the grasping surfaces, so that the recording medium grasping means 22 grasping the cartridge 11C is directed to the storage compartment $16_n$. Subsequently, the access mechanism is actuated to move the swivel base 18 in the X direction, and the recording medium grasping means 22 is stopped at a position corresponding to the storage compartment 16₂. In this state, the picker motor 25 rotates, and the finger base 23 moves on the hand base 14 toward the storage compartment 16₂, and the cartridge 11C is put into the storage compartment 16₂ as described above. In this manner, the exchange process between the cartridges 11A and 11C is performed.

It is also possible to execute a process of conveying merely a cartridge from one storage compartment to another storage compartment.

In the double-frame type library apparatus of the invention, as described herein, the pair of recording medium grasping means for opening and closing individually are conveyed integrally while being supported so that the grasping surfaces may mutually face in reverse directions, and the direction of the grasping surfaces is reversed integrally by the direction reversing means. Therefore, the increase in the number of constituent parts can be suppressed, and the time required for exchange of recording media between storage compartments can be shortened.

The exchange process control as described above is performed by the controller 24 controlling the swivel motor 13, the picker motor 25, and the finger cam motor 26.

The invention is herein described by referring to its preferred embodiment, but the double-frame type library apparatus of the invention is not limited to the illustrated embodiment alone, but it must be understood that changes and variations of the double-frame type library apparatus may be made without departing from the spirit or scope of the invention.

What is claimed is:

1. A double frame library apparatus comprising first and second storage compartment frames each having a plurality of storage compartments for accommodating information media, respectively, wherein the first and second storage compartment frames are positioned on opposing sides of the double frame library apparatus, further comprising:
    a grasping member having a first member for grasping a first information medium and a second member for grasping a second information medium, wherein the first and second members are facing outwardly in opposite directions and facing the first and second storage compartment frames;
    a conveying member for conveying the grasping member to a position corresponding to a desired storage compartment of the first and second storage frame; and
    a direction reversing member for reversing the first member and the second member on the conveying member, wherein the direction reversing member maintains an upward orientation of an upward facing surface of the first and second information medium after reversing the first member and the second member on the conveying member.

2. The library apparatus according to claim 1, wherein the conveying member conveys the grasping member to such a position that one of the first and second members can grasp and release an information medium in a storage compartment.

3. A library apparatus comprising first and second storage compartment frames each having a plurality of storage compartments for accommodating information media, respectively, wherein the first and second storage compartment frames are opposite to each other further comprising:
    a grasping member having a first member for grasping a first information medium and a second member for grasping a second information medium, wherein the first and second members are facing outwardly in opposite directions;
    a conveying member for conveying the grasping member to a position corresponding to a desired storage compartment of the first and second storage frame; and
    a direction reversing member for reversing the first member and the second member on the conveying member, wherein the direction reversing member maintains an upward orientation of an upward facing surface of the first and second information medium after reversing the first member and the second member on the conveying member, wherein
    the first member comprises a pair of first fingers which are each rotatably supported to the conveying member, wherein the first fingers are biased in the closed position and are forced to be opened by a driving member, and
    the second member comprising a pair of second fingers which are rotatably supported to the conveying member, wherein the second fingers are biased in the closed position and are forced to be opened by the driving member.

4. The library apparatus according to claim 3, wherein the driving member comprises a cam which is rotatably provided between the first and second members, the cam rotating such that the cam presses the first fingers to be opened at a first rotation position, presses the second fingers to be opened at a second rotation position, and presses neither the first fingers nor second fingers at a third rotation position.

5. The library apparatus according to claim 3, wherein
    the first fingers comprises a pair of first L-shaped finger members which are opposed to each other such that the first L-shaped finger members are symmetric with respect to a line and are forced to be opened by the driving member pressing one ends thereof, and
    the second fingers comprises a pair of second L-shaped finger members which are opposed to each other such that the second L-shaped finger members are symmetric with respect to the line and are forced to be opened by the driving member pressing one ends thereof.

6. The library apparatus according to claim 5, wherein the L-shaped finger members are biased by a spring for generating a grasping force.

7. The library apparatus according to claim 5, wherein a finger roller is placed between the L-shaped finger member and the driving member for biasing the finger member open or close when forced by the driving member.

8. The library apparatus according to claim 3, wherein the conveying member conveys the grasping member in three dimensions.

9. The library apparatus according to claim 3, wherein the conveying member comprises:
    a swivel base moveable in the X-Y direction;
    a hand base rotatably mounted on the swivel base; and
    a slide guide extending in the Z direction orthogonal to the X-Y direction, the grasping member being supported on the slide guide.

10. The library apparatus according to claim 9, wherein the grasping member are opposing L-shaped arms rotatably mounted on a finger base, the finger base being mounted on the slide guide.

11. The library apparatus according to claim 9, further comprising:
    a finger base mounted on the slide guide;
    a cam mounted on the finger base and between the first and second members,
    wherein when the cam rotates the first and second members grasp the first and second information medium.

12. The library apparatus according to claim 11, further comprising fingers attached to opposing ends of an L-shaped finger member for grasping the information medium.

13. A library apparatus comprising first and second storage compartment frames each having a plurality of storage compartments for accommodating information media, respectively, wherein the first and second storage compartment frames are opposite to each other further comprising:

a grasping member having a first member for grasping a first information medium and a second member for grasping a second information medium, wherein the first and second members are facing outwardly in opposite directions;

a conveying member for conveying the grasping member to a position corresponding to a desired storage compartment of the first and second storage frame; and a direction reversing member for reversing the first member and the second member on the conveying member, wherein the direction reversing member maintains an upward orientation of an upward facing surface of the first and second information medium after reversing the first member and the second member on the conveying member, wherein the conveying member conveys the first and second members to such a position that one of the first and second members can grasp and release an information medium in a storage compartment, and the first member comprises a pair of first fingers which are each rotatably supported to the conveying member, wherein the first fingers are biased in the closed position and are forced to be opened by a driving member, and the second member comprising a pair of second fingers which are rotatably supported to the conveying member, wherein the second fingers are biased in the closed position and are forced to be opened by the driving member.

14. The library apparatus according to claim 13, wherein the driving member comprises a cam which is rotatably provided between the first and second members, the cam rotating such that the cam presses the first fingers to be opened at a first rotation position, presses the second fingers to be opened at a second rotation position, and presses neither the first fingers nor second fingers at a third rotation position.

15. The library apparatus according to claim 13, wherein the first fingers comprises a pair of first L-shaped finger members which are opposed to each other such that the first L-shaped finger members are symmetric with respect to a line and are forced to be opened by the driving member pressing one ends thereof, and the second fingers comprises a pair of second L-shaped finger members which are opposed to each other such that the second L-shaped finger members are symmetric with respect to the line and are forced to be opened by the driving member pressing one ends thereof.

16. A method for conveying an information medium in a double frame library apparatus comprising a first and second storage frame each having a plurality of storage compartment for accommodating information media, respectively, wherein the first and second storage compartment frames are opposite to each other, the method comprising the steps of:

driving open a first grasping means;

releasing the first grasping means and grasping a first information medium out of a first storage compartment positioned on a first side of the double frame library apparatus;

driving open a second grasping means;

releasing the second grasping means and grasping a second information medium out of a second storage compartment positioned on a second side of the library apparatus opposing the first side such that the first and second information media are facing outwardly in opposite directions;

reversing the first and second information media in position;

storing the first information medium into the second storage compartment; and storing the second information medium into the first storage compartment.

17. The method according to claim 16, wherein the first and second information media are taken out of the first and second storage compartments of the first and second storage compartment frames, respectively, without reversing the first and second information media any more.

18. The method according to claim 16, wherein the first and second information media are taken out of the first and second storage compartments of one of the first and second storage compartment frames by reversing the first and second information media one more time.

19. A library apparatus comprising first and second storage compartment frames each having a plurality of storage compartments for accommodating information media, respectively, wherein the first and second storage compartment frames are opposite to each other further comprising:

a grasping member having a first member for grasping a first information medium and a second member for grasping a second information medium, wherein the first and second members are facing outwardly in opposite directions;

a conveying member for conveying the grasping member to a position corresponding to a desired storage compartment of the first and second storage frame;

a direction reversing member for reversing the first member and the second member on the conveying member, wherein the direction reversing member maintains an upward orientation of an upward facing surface of the first and second information medium after reversing the first member and the second member on the conveying member;

a biasing member having a first biasing member for biasing the first member in a closed position and a second biasing member for biasing the second member in the closed position, the first and second members grasping the first and second information medium in the biased closed position; and a driving member for individually driving one of the first and second members in an open position.

20. The library apparatus according to claim 19, wherein the grasping member are opposing L-shaped arms, and the first and second biasing members are first and second springs positioned between the opposing L-shaped arms of the grasping member.

* * * * *